United States Patent Office 2,900,380
Patented Aug. 18, 1959

2,900,380

ANTHRAQUINONE-AZOIC PIGMENTS

Herman A. Bergstrom, Loudonville, N.Y., ass'gnor to General Aniline & Film Corporation, New York, N.Y., a corporation of Delaware No Drawing. Application February 15, 1957
Serial No. 640,330

10 Claims. (Cl. 260—164)

This invention relates to improved anthraquinone azoic pigments and process of preparing the same.

The novel products of the present invention are produced by coupling a diazo component obtained from a chloro substituted amino anthraquinone with either a 2-hydroxy-3-carbazolecarboxylic anilide or an alpha-hydroxybenzocarbazolecarboxylic acid anilide, preferably one in which the anilide moiety contains at least one halo substituent.

While dyestuffs prepared by coupling a diazo from aminoanthraquinone with certain hydroxycarbazolecarboxylic acid anilides and alpha-hydroxybenzocarbazolecarboxylic acid anilides have been suggested in the art, e.g. in U.S. Patents Nos. 1,940,059 and 1,934,009 respectively, the products of these patents are not satisfactory as pigments.

In the preparation of azo dyestuffs employing as a coupler either hydroxycarbazolecarboxylic acid anilides or alpha-hydroxybenzocarbazolecarboxylic acid anilides as described in the above mentioned U.S. Patents 1,940,059 and 1,934,009, the material to be dyed has been impregnated with a solution of the coupler and developed in a bath containing a diazo component or alternatively as described in Patent 1,940,059, the dyestuff has been formed by adding a solution of the diazo component to a solution of the coupler. I have found that this usual method for producing azo dyestuffs employing hydroxycarbazolecarboxylic acid anilides or alpha-hydroxybenzocarbazolecarboxylic acid anilides as the coupler is not satisfactory for the preparation of the novel products of the present invention since efforts to produce the novel pigments in this invention in this conventional manner resulted in the formation of pigments which were dull in shade and sensitive to alkalies, thus indicating incomplete coupling and a high degree of impurity.

I have found, however, that the anthraquinone azoic pigments of the present invention may be produced in good yield and with good properties if the amino anthraquinone is first reduced to the leuco sulfuric acid ester and the diazo of this leuco sulfuric acid ester is then formed by conventional diazotization procedures and then coupled with a hydroxycarbazolecarboxylic acid anilide or an alpha-hydroxybenzocarbazolecarboxylic acid anilide. This coupling is effected in known manner and preferably in an alkaline solution (pH 7.5 to 11). In either event, the temperature during coupling should be maintained in the range of 0° to 5° C., since the diazotized leuco sulfuric acid ester of the amino anthraquinone decomposes readily even at room temperature. These leuco sulfuric acid esters have the advantage of being comparatively soluble so that complete coupling is readily obtained. On completion of the coupling there is obtained the leuco sulfuric acid esters of the anthraquinone azoic pigment which may be directly further processed as described below if desired. However, in order to obtain a final pigment of highest purity it is preferred to isolate the leuco sulfuric acid esters by salting out, filtering and redissolving them in water. A solution of about 1 to 30% concentration is preferred. The leuco sulfuric acid esters of the anthraquinone azoic dyestuff are then oxidized by the addition of an oxidizing agent to the solution of the leuco esters whereby they are converted to the anthraquinone azoic pigments. The oxidizing agents which may be employed in this oxidation step may be any of the usual oxidizing agents such as per acids and salts such as hydrogen peroxide, sodium perborate, sodium and potassium permanganate, sodium peroxide, sodium persulfate, and also oxidizing agents such as sodium dichromate, ferric chloride and the like. Sodium nitrite is particularly preferred as the oxidizing agent since it is inexpensive, easy to use and leaves no undesirable metallic by-products. To effect the oxidation, an amount of oxidizing agent from a calculated equivalent amount of oxidizing agent per leuco to be oxidized up to about 150% excess oxidizing agent may be used. After the addition of the oxidizing agent it is advantageous to warm the reaction mixture for a while, for example, from ½ to 5 hours at a temperature range of from about 60° C. to 90° C. On completion of the oxidation the pigment is filtered, washed and dried in any suitable manner, or, if desired, the pigment may be recovered and used as a paste. In carrying out the oxidation, it has been found preferable and advantageous to effect the oxidation in the presence of a small amount of polymeric-N-vinyl-alpha-pyrrolidone in the manner described in my copending application Serial No. 616,135 filed on October 16, 1956.

The thus obtained novel anthraquinone azoic pigments of the present invention have the following general formulae:

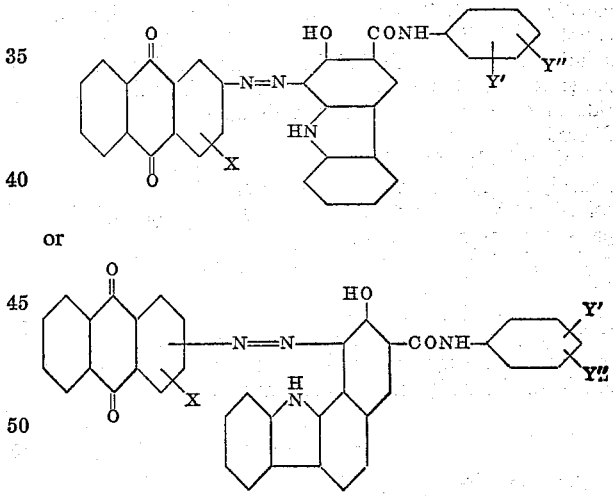

depending on whether the hydroxycarbazolecarboxylic acid anilide or the alpha-hydroxybenzocarbazolecarboxylic acid anilide is employed as the coupling component. In this formula X represents halogen e.g. (chloro or bromo) and Y' represents hydrogen or halogen (chloro or bromo), and Y" represents hydrogen or halogen, lower alkyl or lower alkoxy (by lower alkyl and lower alkoxy is meant a group of 1 to 4 carbon atoms.)

As will be apparent from the above general formula and description of method and preparation of the novel products of the present invention, the halo substituted amino anthraquinones which have been found to be useful in producing the novel pigments of this invention include 1-amino-2-chloro anthraquinone, 1-amino-2-bromoanthraquinone, 1-amino-4-chloroanthraquinone, 1-amino-5-chloroanthraquinone, 1-amino-6-chloroanthraquinone, 2-amino-1-chloroanthraquinone, and 2-amino-3-chloroanthraquinone and the corresponding bromo analogs. The hydroxycarbazolecarboxylic acid anilides which are useful as coupling components in the preparation of the novel pigments of the present invention include 2-hydroxy-3-carbazolecarboxanilide
2-hydroxy-3'-chloro-3-carbazolecarboxanilide
2-hydroxy-4'-chloro-3-carbazolecarboxanilide
2-hydroxy-3',4'-dichloro-3-carbazolecarboxanilide
2-hydroxy-2',5'-dichloro-3-carbazolecarboxanilide
2-hydroxy-11H-benzo [a] carbazole-3-carboxanilide
2-hydroxy-3'-chloro-11H-benzo [a] carbazole-3-carboxanilide
2-hydroxy-4'-chloro-11H-benzo [a] carbazole-3-carboxanilide
2-hydroxy-3',4'-dichloro-11H-benzo [a] carbazole-3-carboxanilide
2-hydroxy-2',5'-dichloro-11H-benzo [a] carbazole-3-carboxanilide The detailed preparation of the products of the present invention and preferred products are illustrated by the following specific examples in which the parts are by weight and from which the details of this invention will be apparent to those skilled in the art.

*Example I*

46.3 parts of the sodium salt of 2-amino-3-chloroanthraquinone-9,10-dihydrodisulfuric acid ester are dissolved in 200 parts of water and iced to 0° C. 29 parts hydrochloric acid 20° Bé. are now added. The resulting hydrochloride is diazotized by the slow addition of 6.9 parts sodium nitrite as a 31.5% solution. The temperature is maintained below 5° C. by addition of ice. The diazo slurry is run into a solution (at 0°–5° C.) of 37.1 parts of 2-hydroxy-3',4'-dichloro-3-carbazolecarboxanilide dissolved in 180 parts water and 10 parts caustic soda (30% by wt. soln.), always keeping the coupling alkaline by further addition of caustic soda solution as needed (pH 7.5–9.5). The alkaline solution is agitated for 1 hour and then salted with sodium chloride in order to precipitate the dyestuff, which is then filtered.

This soluble dyestuff is converted to the pigment by hydrolysis and oxidation as follows: The dye is dissolved in 1500 parts water and heated to 70–80° C. 13 parts sodium nitrite (31.5% soln.) are added. Under rapid agitation, 95 parts hydrochloric acid 20° Bé. are added. Foaming may occur. The slurry is heated to and maintained at 70–90° C. for ½–1 hr. The pigment is isolated by filtering and washing acid free. A brown pigment of particular interest for use on leather is thus obtained. This pigment has the formula:

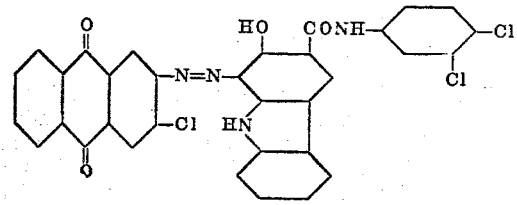

*Example II*

46.3 parts of sodium salt of 2-amino-3-chloroanthraquinone-9,10-dihydrodisulfuric acid ester is diazotized as in Example I. The diazo slurry is run into a solution (0° to 5° C.) of 37 parts of 2-hydroxy-11H-benzo [a] carbazole-3-carboxanilide dissolved in 200 parts of water and 10 parts of caustic soda (30% by wt. soln.) always keeping the coupling alkaline (pH 7.5–9.5) by the addition of more caustic soda as needed. The solution is salted with sodium chloride and the dyestuff filtered. On hydrolysis and oxidation, as in Example I, a bluish pigment is recovered which is of particular interest for use on leather and which has the following formula:

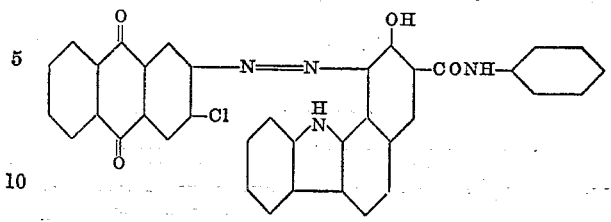

*Example III*

The procedure of Example I was repeated employing instead of the dye intermediates of Example I; 46.3 parts 2-amino-3-chloroanthraquinone-9,10-dihydrodisulfuric acid ester and 33.7 parts 2-hydroxy-4'-chloro-3-carbazolecarboxanilide. There was obtained a brown pigment, having very good light fastness, of the formula:

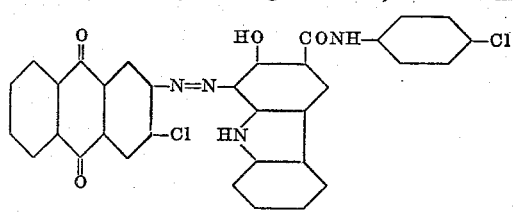

*Example IV*

The procedure of Example I was repeated employing instead of the dye intermediates of Example I; 46.3 parts 2-amino-1-chloroanthraquinone - 9,10 - dihydrodisulfuric acid ester and 33.7 parts 2-hydroxy-4'-chloro-3-carbazolecarboxanilide. There was obtained a brown pigment of the formula:

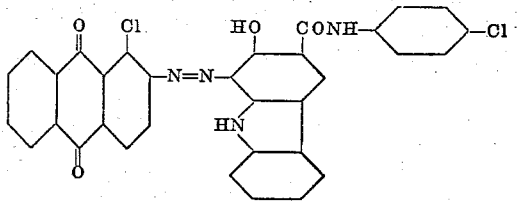

*Example V*

The procedure of Example I was repeated employing instead of the dye intermediates of Example I; 46.3 parts 2-amino-3-chloroanthraquinone - 9,10 - dihydrodisulfuric acid ester and 43.8 parts 2-hydroxy-3',4'-dichloro-11H-benzo [a] carbazole-3-carboxanilide. There was obtained a bluish pigment of the formula:

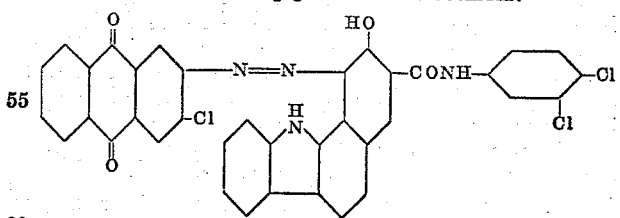

*Example VI*

The procedure of Example I was repeated employing instead of the dye intermediates of Example I; 46.3 parts 2-amino-3-chloroanthraquinone-9,10-dihydrosulfuric acid ester and 40 parts 2-hydroxy-11H-benzo [a] carbazole-3-carboxy-p-anisidide, which are reacted as in Example I to form a bluish pigment of the formula:

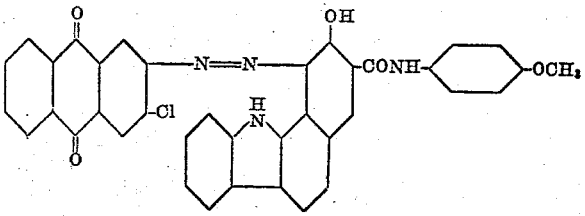

Example VII

The procedure of Example I was repeated employing instead of the dye intermediates of Example I; 46.3 parts 2 - amino - 3 - chloroanthraquinone - 9,10 - dihydrosulfuric acid ester and 43.4 parts 2-hydroxy-3'-chloro-11H-benzo [a] carbazolecarbox-p-anisidide, which are reacted as in Example I to form a bluish pigment of the formula:

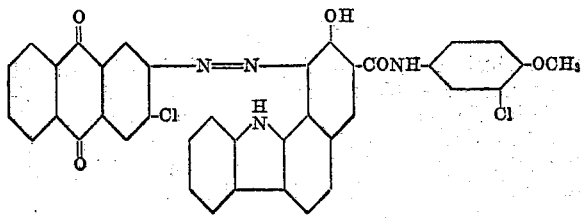

Example VIII

The procedure of Example I was repeated employing instead of the dye intermediates of Example I; 46.3 parts 1 - amino - 6 - chloroanthraquinone - 9,10 - dihydrosulfuric acid ester and 36.7 parts 2-hydroxy-3'-chloro-3-carbazolecarbox-p-anisidide, which are reacted as in Example I to form a brownish pigment of the formula:

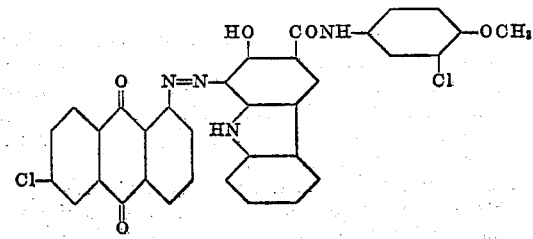

I claim:
1. Insoluble pigments of the anthraquinone-azoic series selected from the group consisting of compounds of the formula

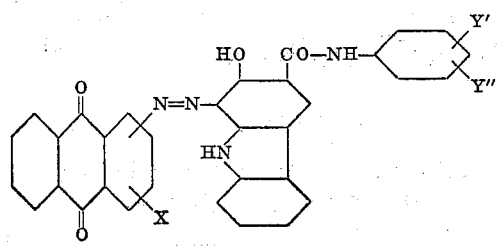

and

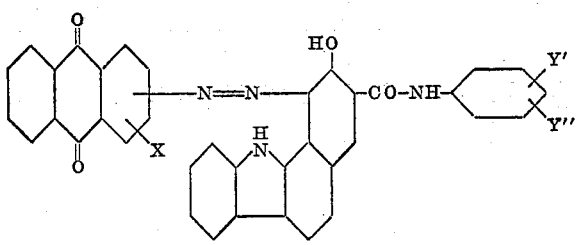

wherein X represents a member of the group consisting of chlorine and bromine, Y' represents a member of the group consisting of hydrogen, halogen, Y" represents a member of the group consisting of hydrogen, halogen, lower alkyl and lower alkoxy when produced by diazotizing the leuco sulfuric acid esters of halogenated aminoanthraquinone corresponding to the diazo moiety of the pigment and coupling the same with a 2-hydroxy-3-carbazolecarboxanilide coupler corresponding to the coupling moiety of the pigment, subjecting the thus obtained product to the action of an oxidizing agent to convert it to the anthraquinoid-azoic pigment.

2. Insoluble pigments of the anthraquinone-azoic series which have the formula:

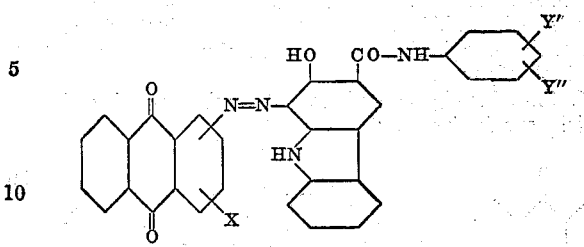

wherein X represents a member of the group consisting of chlorine and bromine, Y' represents a member of the group consisting of hydrogen, halogen, and Y" represents a member of the group consisting of hydrogen, halogen, lower alkyl and lower alkoxy when produced by diazotizing the leuco sulfuric acid esters of halogenated aminoanthraquinone corresponding to the diazo moiety of the pigment and coupling the same with a 2-hydroxy-3-carbazolecarboxanilide coupler corresponding to the coupling moiety of the pigment, subjecting the thus obtained product to the action of an oxidizing agent to convert it to the anthraquinoid-azoic pigment.

3. Insoluble pigments of the anthraquinone-azoic series which have the formula:

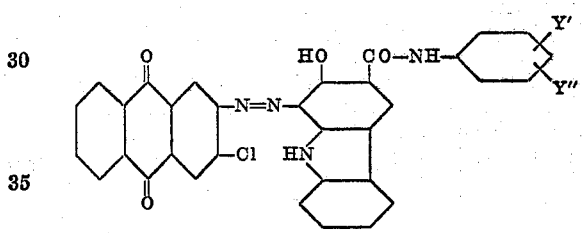

wherein Y' represents a member of the group consisting of hydrogen, and halogen, and Y" represents a member of the group consisting of hydrogen, halogen, lower alkyl and lower alkoxy when obtained by diazotizing the leuco sulfuric acid ester of 2-amino-3-chloroanthraquinone and coupling the thus obtained diazo with a 2-hydroxy-3-carbazolecarboxanilide coupler corresponding to the coupler moiety of the pigment molecule and treating the thus obtained product with an oxidizing agent to thereby form said insoluble pigment.

4. Insoluble pigments of the anthraquinone-azoic series which have the formula:

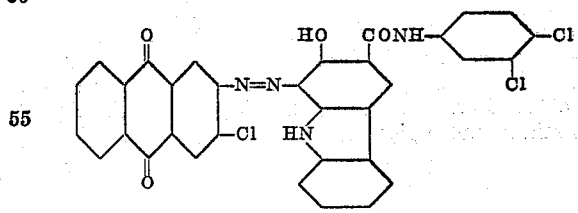

when obtained by diazotizing 2-amino-3-chloroanthraquinone-9,10-dihydrodisulfuric acid ester and coupling the same with 2-hydroxy-3',4'-dichloro-3-carbazolecarboxanilide and treating the thus obtained product with an oxidizing agent to thereby form said insoluble pigment.

5. Insoluble pigments of the anthraquinone-azoic series which have the formula:

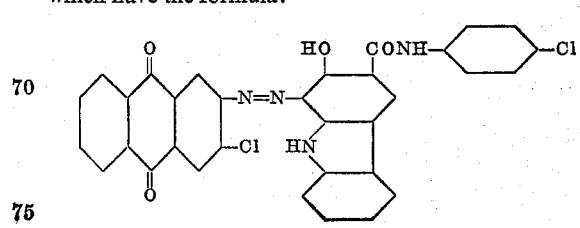

when obtained by coupling 2-amino-3-chloroanthraquinone-9,10-dihydrodisulfuric acid ester and coupling the thus obtained diazo with 2-hydroxy-4'-chloro-3-carbazole-carboxanilide and treating the thus obtained product with an oxidizing agent to thereby form the said insoluble pigment.

6. Insoluble pigments of the anthraquinone-azoic series which have the formula:

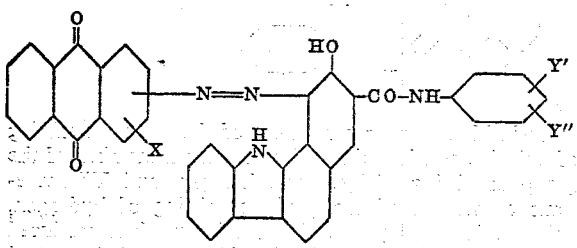

wherein X represents a member of the group consisting of chlorine and bromine, Y' represents a member of the group consisting of hydrogen, and halogen, and Y" represents a member of the group consisting of hydrogen, halogen, lower alkyl and lower alkoxy when obtained by diazotizing the leuco sulfuric acid ester of a halogenated 2-aminoanthraquinone corresponding to the diazo moiety of said pigment, coupling the same with a 2-hydroxy-11H-benzo[a] carbazole-3-carboxanilide coupler corresponding to the coupler moiety of said pigment and treating the thus obtained product with an oxidizing agent to thereby form the said insoluble pigment.

7. Insoluble pigments of the anthraquinone-azoic series which have the formula:

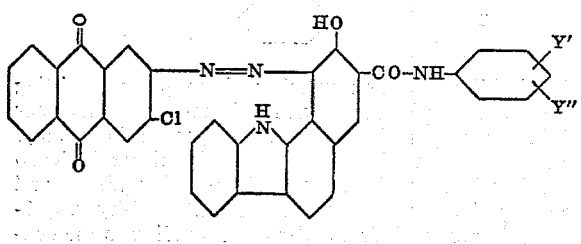

wherein Y' represents a member of the group consisting of hydrogen, halogen, and Y" represents a member of the group consisting of hydrogen, halogen, lower alkyl and lower alkoxy when obtained by diazotizing 2-amino-3-chloroanthraquinone-9,10-dihydrodisulfuric acid ester and coupling the thus obtained diazo with a 2-hydroxy-11H-benzo-[a] carbazole-3-carboxanilide corresponding to the coupler moiety of said pigment and treating the thus obtained product with an oxidizing agent to thereby form said insoluble pigment.

8. Insoluble pigments of the anthraquinone-azoic series which have the formula:

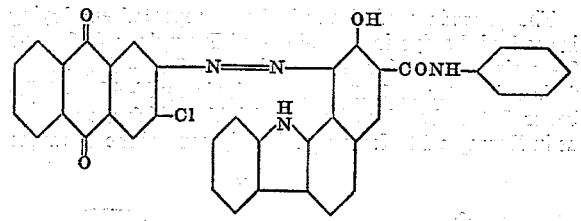

when obtained by diazotizing the sulfuric acid ester of 2 - amino - 3 - chloroanthraquinone - 9,10 - dihydrodisulfuric acid and coupling the thus obtained diazo with 2-hydroxy-11H-benzo[a] carbazole-3- carboxanilide and treating the thus obtained product with an oxidizing agent to thereby form the said insoluble pigment.

9. Insoluble pigments of the anthraquinone-azoic series which have the formula:

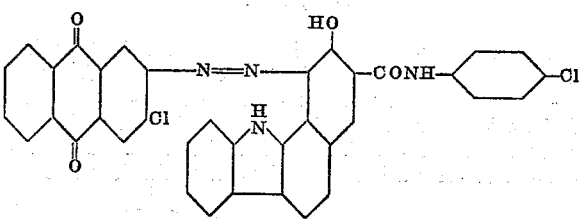

when obtained by diazotizing 2-amino-3-chloroanthraquinone-9,10-dihydrodisulfuric acid ester and coupling the thus obtained diazo with 2-hydroxy-3',4'-dichloro-11H-benzo[a] carbazole-3-carboxanilide and treating the thus obtained product with an oxidizing agent to thereby form said insoluble pigment.

10. Compounds selected from the group consisting of insoluble pigments of the anthraquinone-azoic series and their leuco sulfuric acid esters which in their pigment form have the formula:

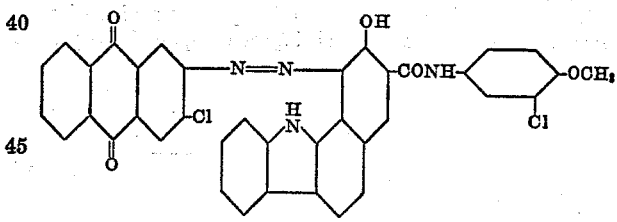

References Cited in the file of this patent

UNITED STATES PATENTS

| | | |
|---|---|---|
| 1,855,289 | Haller et al. | Apr. 26, 1932 |
| 1,924,774 | Fairweather | Aug. 29, 1933 |
| 1,934,009 | Schmelzer et al. | Nov. 7, 1933 |
| 1,940,059 | Muth | Dec. 19, 1933 |

OTHER REFERENCES

Vat Dyes, AATC Monograph No. 2, 1953, pp. 261, 262.